United States Patent [19]

Laub

[11] 4,366,781

[45] Jan. 4, 1983

[54] FUEL SYSTEM FOR VEHICLES

[76] Inventor: Herman Laub, 244 N. San Marino Ave., San Gabriel, Calif. 91775

[21] Appl. No.: 230,038

[22] Filed: Jan. 30, 1981

[51] Int. Cl.³ .................................... F02M 31/14
[52] U.S. Cl. .................................. 123/3; 123/1 A; 123/41.22; 202/83; 203/DIG. 8
[58] Field of Search ............ 123/1 A, 3, 25 Q, 41.22, 123/41.42; 202/83; 203/DIG. 8

[56] References Cited

U.S. PATENT DOCUMENTS

| | | | |
|---|---|---|---|
| 1,741,464 | 12/1929 | Hunt | 123/41.22 X |
| 2,389,064 | 11/1945 | Latham, Jr. | 202/75 |
| 2,413,770 | 1/1947 | Knoy | 123/41.21 X |
| 2,637,684 | 5/1953 | Buffum | 202/75 |
| 2,643,974 | 6/1953 | Impagliazzo | 202/163 |
| 3,511,218 | 5/1970 | Lazaros | 123/1 A |
| 3,788,283 | 1/1974 | Perry | 123/3 |
| 3,973,524 | 8/1976 | Rubin | 123/41.42 |
| 4,325,329 | 4/1982 | Taylor | 123/3 |

*Primary Examiner*—William A. Cuchlinski, Jr.
*Attorney, Agent, or Firm*—Lyon & Lyon

[57] ABSTRACT

To provide fuel for a vehicle, a product of fermentation such as a water/ethanol mixture is circulated in the cooling circuit of the engine of the vehicle. The fuel is distilled from the cooling circuit and at least a portion of the distilled fuel is burned in the engine, either as a vapor or as a condensate. Also disclosed are a sensor for determining when the fuel content of the distillate is sufficiently high for combustion and a carburetor for the distilled fuel, which is of varying alcohol content.

23 Claims, 4 Drawing Figures

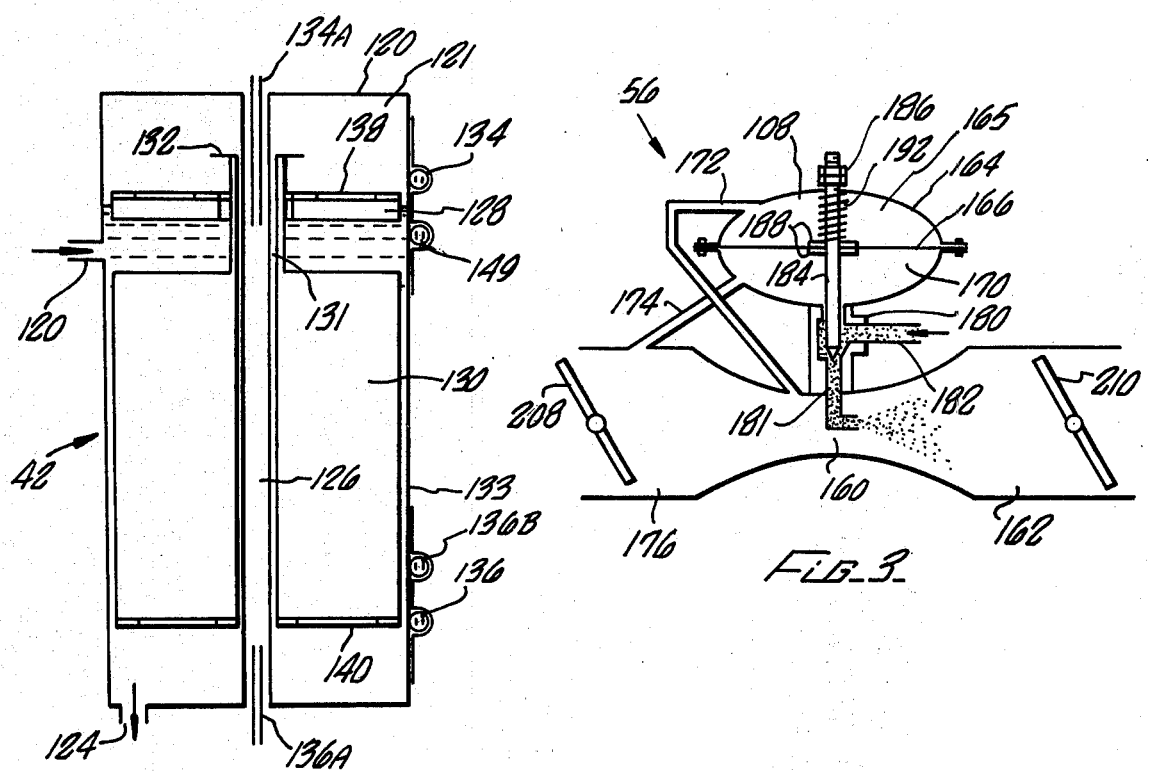
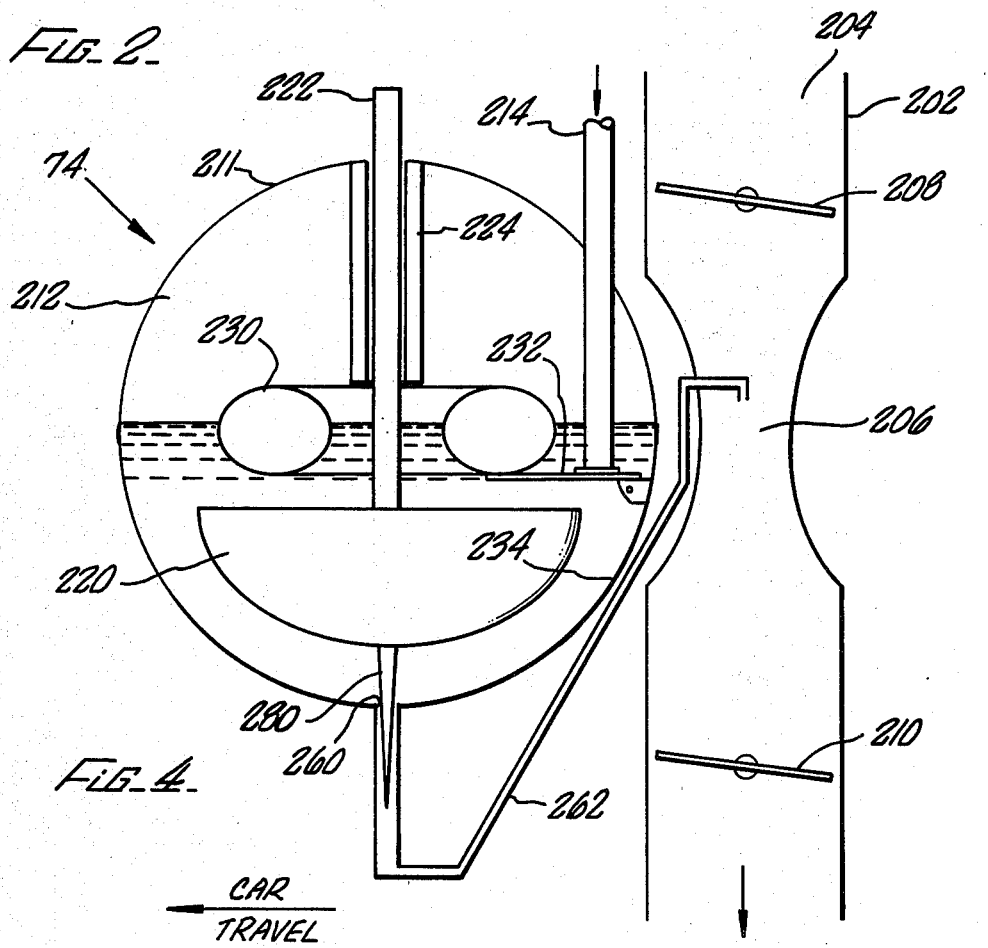

FUEL SYSTEM FOR VEHICLES

BACKGROUND

The present invention is directed to a fuel distillation system for use in conjunction with an internal combustion engine.

In view of the ever-increasing shortage of conventional fossil fuels, substantial attention is being directed to preparing fuels by fermentation of biomass. For example, grains such as corn are converted by fermentation into a mixture of ethanol, water, and solid impurities.

A difficulty in utilization of alternate fuel sources produced by fermentation of biomass is the energy cost of recovering the alcohol from the product of fermentation. Fermentation normally produces a product containing only from about 10 to 15% alcohol content. A substantial portion of the heating value of any alcohol recovered by distillation is offset by the energy required to distill the alcohol from the water. This problem limits the value of alcohol as a fuel for use in the internal combustion engines of vehicles.

In view of this problem, there is a need for a method and an apparatus which permit the internal combustion engine of a vehicle such as a car to directly use the fuel of a product of fermentation without prior distillation.

SUMMARY

The present invention is directed to a method and apparatus that satisfy this need. In the method, fuel is provided to an internal combustion engine vehicle. The engine comprises a carburetor and a cooling circuit, where the cooling circuit has a circulating coolant. A product of fermentation is circulated in the cooling circuit. The cooling circuit is maintained at a sufficiently high temperature to distill a fuel-rich vapor from the coolant. The distillation is caused by heat transferred to the coolant from combustion of fuel in the cylinders of the engine. The fuel-rich vapor has a higher percentage by weight fuel content than the fuel content of the coolant. At least a portion of the fuel of the fuel-rich vapor is burned in the engine. This can be done by directly introducing the fuel-rich vapor to the cylinders via a vapor phase carburetor, or condensing the fuel-rich vapor and introducing the condensate to a carburetor for a liquid fuel, either alone, or combined with gasoline as gasohol.

The fuel content of the fuel introduced to the engine for combustion can be increased by introducing the fuel-rich vapor to a reflux column for separating the vapor into a fuel-enriched vapor and a fuel-lean liquid. Fuel-lean liquid is withdrawn from a bottom portion of the reflux column, condensed, and recycled to the cooling circuit to distill residual fuel. The fuel-enriched vapor can be burned directly in the cylinders, or can be condensed into a condensate to be burned.

Apparatus for practicing this method for vehicles powered by combustion engines includes a storage tank for the product of fermentation, means for introducing the product of fermentation into the cooling circuit, and temperature control means for maintaining the cooling circuit at a sufficiently high temperature to distill fuel-rich vapor from the coolant. Means are also provided for introducing at least a portion of the fuel of the fuel-rich vapor into the cylinders of the engine for burning.

Proper control of the method and apparatus involves the use of a sensor for continuously determining the fuel content of a mixture containing a first liquid (such as ethanol) and a second liquid (such as water) of a different density. For example, an ethanol-water mixture should contain at least 50% to 60% alcohol to burn effectively in an internal-combustion engine. A sensor for insuring that the fuel content of the fluid mixture introduced to the engine is sufficiently high comprises a housing having an inlet and an outlet for the mixture. In the housing there is a float, the float having a selected density such that (i) the float is above a selected elevation when the fluid mixture in the housing has an ethanol content less than the selected value and (ii) the float is at or below the selected elevation when the mixture in the housing has an ethanol content equal to or greater than the selected value. Sensing means for detecting when the float is at or below the selected elevation are also provided.

The present invention also provides a special carburetor for fuel comprising first and second liquids, the first liquid (such as ethanol) having a lower density and a higher fuel value than the second liquid (such as water). The carburetor comprises a housing having an inlet and an outlet, the outlet being at the bottom of the housing. There is a float in the housing above the outlet, the float having a selected density such that the vertical distance between the float and the outlet is directly proportional to the second liquid content of the fuel. Means are provided on the float for varying the cross-sectional area of the outlet in response to the distance between the float and the outlet. The varying means can comprise a needle-shaped projection mounted on the bottom of the float and extending into the outlet.

DRAWINGS

These and other features, aspects, and advantages of the present invention will become better understood with reference to the following description, appended claims, and accompanying drawings where:

FIG. 2 is a front elevation view, partially in section, of a sensor for determining the fuel content of a mixture containing fuel and water for use with the engine of FIG. 1;

FIG. 3 is a front elevation view, partially in section, of a carburetor for a gaseous fuel for use with the engine of FIG. 1; and FIG. 4 is a front elevation view, partially in section, of a carburetor for a liquid fuel comprising a mixture of an organic liquid and water for use with the engine of FIG. 1.

DESCRIPTION

Figure 1:
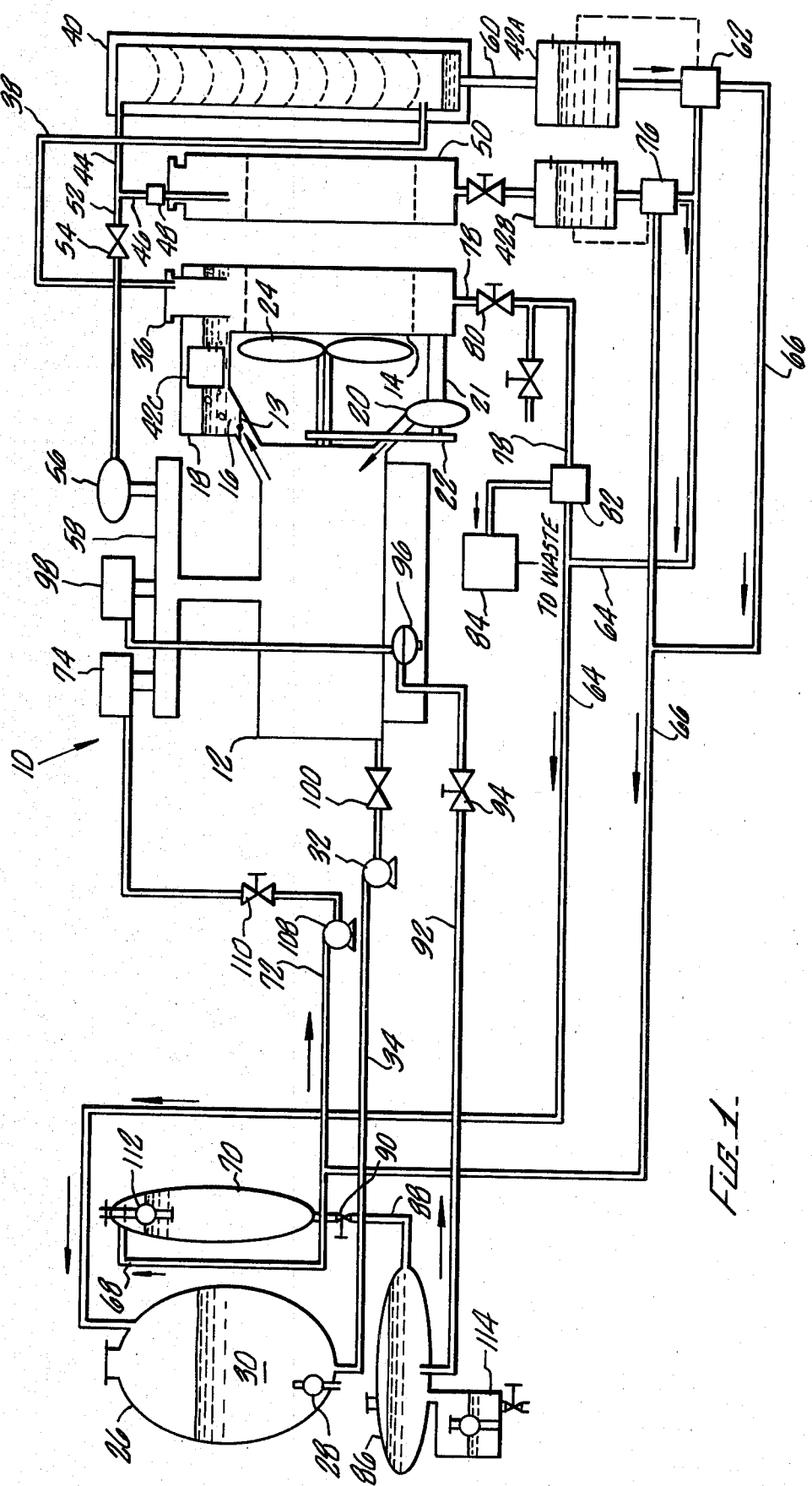
FIG. 1 is a schematic view of an internal-combustion engine adapted for distillation of fuel from a product of fermentation in accordance with the present invention.

The present invention provides a method and apparatus which permit an internal combustion engine of a vehicle such as an automobile to directly use the fuel of a product of fermentation without prior distillation. As used herein, the term "product of fermentation" refers to the product obtained by an enzymatic transformation of an organic compound. The product of fermentation currently most available is that obtained by enzymatic transformation of grains such as wheat and corn to a mixture comprising ethanol, water, dissolved carbon dioxide, and solid impurities. Other organic compounds can be transformed such as seaweed and grapes (as in wine making). Organic fuels other than ethanol can be produced, including other alcohols such as methanol and isopropyl alcohol. Generally, a product of fermentation prior to any concentration or distillation contains only from about five to about fifteen percent by weight organic fuel produced by the fermentation process. Although the apparatus of FIGS. 1-4 will be described in terms of a product of fermentation comprising ethanol and water, they can be used for other products of fermentation.

The Engine

FIG. 1 is a schematic drawing of an internal combustion engine 10 adapted for distillation of fuel from a product of fermentation in accordance with the present invention. The engine 10 includes a jacketed engine block 12 provided with a radiator 14. Coolant 16 circulates from the engine block 12 through a thermostatic butterfly valve 13 to the radiator 14 through an expansion tank 18 and is pumped from the radiator 14 back to the engine block 12 by a pump 20 through a transfer hose 21. This path for the coolant comprises a cooling circuit. The pump 20 is driven by a drive 22 which also drives a fan 24 for cooling the radiation 14.

The product of fermentation is stored in a product of fermentation tank 26 that is provided with a low level float switch 28. Product of fermentation 30 is pumped by a pump 32 via line 34 from the product of fermentation tank 26 to the circulating coolant 16. It can be preheated with engine exhaust.

The expansion tank 18 is provided with a pressure radiator cap 36. Vapor is distilled from the coolant and passes through the pressure radiator cap 36 to the bottom of an insulated reflux tank 40 via line or hose 38.

Overhead vapors from the reflux tank 40 are withdrawn via line 44 and can pass via line 46 through a solenoid valve 48 to an air cooled condensor 50 or via line 52 through a solenoid valve 54 to a vapor diaphragm carburetor 56 (shown in detail in FIG. 3) connected to the intake manifold 58 of the engine.

Liquid condensed in the reflux tank 40 is withdrawn via line 60 through a first ethanol content sensor 42A from which the condensate passes via a valve 62, either to line 64 for recycle to the product of fermentation tank 26 or to line 66. Line 66 has two branches, a first branch 68 leading to an alcohol storage tank 70 and a second branch 72 leading to a liquid alcohol carburetor 74 (shown in detail in FIG. 2) connected to the intake manifold 58.

Similarly, condensate formed in the condenser 50 passes into a second ethanol content sensor 42B, and depending upon its ethanol content, is directed by a valve 76 into line 64 or 66.

The radiator 14 is provided with a withdrawal line 78 having a manual shutoff valve 80 and an automatic three way valve 82 for diverting withdrawn product of fermentation to either a spent product of fermentation storage tank 84 or for recycle via line 64 to the product of fermentation tank 26. Operation of the three way valve 82 is controlled by a third ethanol content sensor 42C mounted in the expansion tank 18.

The engine 10 is provided with a conventional gasoline storage tank 86 connected to the bottom of the alcohol storage tank 70 by a hose 88 provided with a shut off valve 90. The contents of the gasoline storage tank 86 can be pumped via feed line 92 through valve 94 by a fuel pump 96 to a gasoline carburetor 98 connected to the intake manifold 58.

Operation of the engine 10 will now be described for a product of fermentation that is a mixture of ethanol and water. Any solid impurities in the product of fermentation are precipitated and filtered out of the product prior to introduction to tank 26. The ethanol content of the mixture generally is from about five to about fifteen percent by weight. It should of course be realized that the engine 10 can be used for other products of fermentation, including products enriched with ethanol so that they contain more than fifteen percent by weight ethanol.

In use of engine 10, the product of fermentation tank 26 is filled with product of fermentation 30 and gasoline is placed into the gasoline tank 86. The engine is initially started on gasoline from the gasoline tank 86 or alcohol in tank 70. The gasoline is pumped via line 92 and through valve 94 by the gasoline pump 96 to the gasoline carburetor 98. A solenoid-operated valve 100 between the engine block 12 and the product of fermentation tank 26 is opened and product of fermentation 30 is pumped by pump 32 via line 34 into the cooling circuit. While the engine is running and the coolant is sufficiently hot that thermostatic bufferfly valve 13 is open, product of fermentation is continually circulated through the cooling circuit, which comprises the jackets of the engine block 12, the expansion tank 18, the radiator 14, and the transfer hose 21 between the radiator 14 and the engine block.

The third ethanol content sensor 42C used for the expansion cavity 18 includes a float level controller which ensures that there is an adequate level of product of fermentation in the cooling circuit. In the event that there is inadequate level of product of fermentation, the float level controller opens solenoid valve 100 and the product of fermentation pump 32 pumps additional product of fermentation into the circulating coolant. The product of fermentation tank 26 is provided with a level indicator 28 to advise the operator of the vehicle when additional product of fermentation is required.

The heat transferred to the circulating coolant raises its temperature and distills an ethanol-rich vapor from the circulating coolant. To ensure that the vapor has an ethanol content in percentage by weight greater than the ethanol content of the circulating coolant, the thermostatic butterfly valve 13 is provided. When the temperature of the circulating coolant is greater than about 180° F., ethanol rich vapor is permitted to pass via line 38 from the radiator. The thermostatic valve 13 also serves to maintain the circulating coolant as a temperature less than a set maximum temperature by opening to allow the coolant to circulate when the coolant reaches the set maximum temperature of 180° F.

A portion of the circulating coolant is continually bled into the third ethanol content sensor 42C, which determines the ethanol content of the circulating coolant. Whenever the ethanol content of the circulating coolant drops below a selected value, generally less than about 1 percent by weight, the circulating coolant is withdrawn from the cooling circuit. By action of the level control valve of the sensor 42C, fresh make-up product of fermentation is brought in from the product of fermentation storage tank 26. The level control valve of the sensor 42C is provided with an override mechanism so that cirulating coolant cannot be withdrawn from the cooling circuit unless there is sufficient coolant to protect the engine.

The withdrawn circulating coolant (i.e., exhausted product of fermentation) is disposed of by passage to a waste disposal tank 84.

Ethanol-rich vapor distilled from the circulating coolant passes via line 38 to the bottom of the reflux tank or separator 40. In the reflux tank 40, a portion of the vapor is condensed to form an ethanol-lean liquid and a portion passes overhead via line 44 as an ethanol-enriched vapor. The ethanol-enriched vapor can be introduced to the engine via line 52, valve 54 and the vapor phase carburetor 56 to power the vehicle. Alternatively, the ethanol-enriched vapor can be passed via line 46 and valve 48 to the top of the condensor 50 for condensation. Condensate formed in the condenser 50 passes into the second ethanol content sensor 42B which directs solenoid valve 76 to pass the condensate either to the product of fermantation tank 26 via line 64 or to line 66 to go to the alcohol carburetor 74 or to the alcohol storage tank 70. Only when the alcohol content of the condensate is at least about 50% to 60% by weight, can it be passed to the carburetor 74 or the alcohol storage tank 70. When the second ethanol content sensor 42B determines that the condensate has an ethanol content of less than about 60% by weight, it is passed to the product of fermentation tank 26 for reintroduction into the cooling circuit.

The second ethanol content sensor 42B is also provided with a level controller so that three way valve 76 does not allow any condensate to pass into either line 64 or 66 when there is an inadequate level of condensate in the condensor 50.

The fuel-lean liquid from the reflux column 40 is withdrawn through line 60 to the first ethanol content sensor 42A, which is also provided with a level controller. When there is an inadequate level in the reflux vessel 40 to fill the second ethanol content sensor 42A, no liquid is drawn from the reflux vessel 40. Depending upon the ethanol content of the ethanol-lean liquid, the liquid is passed through a three-way valve 62 to either line 64 for recycle to the product of fermentation tank 30, or passed via line 66 for burning as a fuel. When the alcohol is burned directly as a fuel, the liquid passes from line 66 to line 72 for pumping to the liquid alcohol carburetor 74 through an alcohol line valve 110 by an alcohol pump 108. Alternatively, the alcohol is sent to the alcohol storage tank 70.

The alcohol content of the fuel-lean liquid is sufficiently high, i.e., at least about 60%, for burning in the engine only after a fresh batch of product of fermentation is placed in the storage tank 26. Otherwise, the alcohol content of the fuel-lean generally liquid is less than about 60% by weight, and thus the fuel-lean liquid is returned to the product of fermentation tank 26 via line 64.

As soon as possible, the engine is switched over to operation with liquid alcohol introduced via carburetor 74 rather than gasoline introduced through the gasoline carburetor 98. The liquid alcohol storage tank 70 is provided with a float valve 112 to provide the driver of the vehicle with an indication of the level of alcohol in the storage tank 70.

If desired, the alcohol can be passed via line 88 to the gasoline storage tank 86 to form a "gasohol" mixture for introduction to the engine via the gasoline carburetor 98. The gasoline storage tank 86 has a float controller 114 that shuts off the gasoline tank 96 and alerts the operator in the event that the contents of the storage tank 86 have an excessive water content.

The engine of FIG. 1 has many advantages compared to prior art engines using alcohol and other fuels produced by fermentation. For example, with the engine of FIG. 1 it is not necessary to externally distill the alcohol from the product of fermentation. Instead, waste heat generated by burning of fuel is used for distilling the alcohol.

Further, because of the three carburetor system, the engine can operate on gasoline, liquid alcohol, alcohol vapor, or a mixture of gasoline and alcohol (gasohol). Thus, the engine 10 is both economical and versatile.

Not only are the engine 10 and the method of using the engine 10 novel, but also control components of the engine are novel.

Ethanol Content Sensor

With reference to FIG. 2, there is shown a sensor 42 useful as the first, second, and third ethanol content sensors 42A, 42B and 42C, respectively. The sensor 42 comprises a tubular housing 120 enclosing a chamber 121. The housing has a top side opening 122 nd a bottom opening 124, either of which can be sealed closed as required. Mounted within the chamber is a vertically oriented hollow tube 126 around which floats an upper annular float 128 and a lower annular float 130. The lower float 130 has a tubular extension 131 projecting upwardly. The projection is concentric with and around the tube 126. The lower float 130 is spaced apart from the tube 126 and the side wall 133 of the casing so that the lower float can move freely within the chamber. The upper float 128 is spaced apart from the extension 131 and the side wall 133 so it also can move freely in the chamber 121. The extension is provided with a stop 132 to prevent the upper float 128 from floating to the top of the housing or off the lower float.

Mounted on the outside of the side wall 133 near the top of the housing, but below the stop 131, is an upper reed switch 134. A lower reed switch 136 is mounted on the outside of the sidewall 133 near the bottom of the housing. Alternatively, or in addition, an upper reed switch 134A and a lower reed switch 136A can be placed within the tube 126.

A magnet 138 is secured to the top of the upper float 128. When the chamber 121 is substantially filled with liquid, the magnet 138 on the upper float 128 activates the upper reed switch 134, indicating that the chamber is full and ready for sensing of fluid density. The first 42A and the second 42B ethanol content sensors are provided with the upper float 128 for determining when to draw liquid from the reflux vessel 40 and the condenser 50, respectively. Likewise the third ethanol content sensor 42C is provided with the upper float 128 for determining when to draw product of fermentation 30 from tank 26 to the engine block 12.

The first float 128 is formed of a material that floats to the stop 131 when the chamber is full, regardless of the ethanol content of the liquid in the chamber.

The second float 130 is provided with magnets 140 on its lower surface for activating the lower reed switch 136. As the ethanol content in the mixture in the chamber 120 increases, the density of the mixture decreases. The lower float is made of a material having a selected density such that the lower float 130 is in the chamber above the lower reed switch 136 when the mixture in the chamber has an ethanol content less than the selected value (generally about sixty percent by weight for the first 42A and second 42B sensors, and about 2 percent by weight for the third sensor 42C), but at or below the lower reed switch 136 when the mixture in the chamber has an ethanol content equal to or greater than the selected value. The position of the lower reed switch 136 can be varied to correspond to the selected ethanol content. For example, as shown in FIG. 2, the lower reed switch can be located at position 136B for the third sensor 42C, where the selected ethanol content is less than 1% by weight.

The lower float 130 can be made of hollow metal or of a material such as polypropylene.

In operation of the engine 10, when the lower float 130 activates the the reed switch 136, the first ethanol content sensor 42A causes the valve 62 to send the fuel-lean liquid to line 66 for burning in the engine. If the lower reed switch 136 is not activated, then the fuel-lean liquid is sent via line 64 back to the product of fermentation tank 26.

Similarly, when the lower reed switch 136 of the second ethanol content sensor 42B is activated, valve 76 causes the condensate to go to line 66 for burning in the engine. When the lower reed switch is not activated, the condensate has a low ethanol content, and thus is returned via line 64 back to the product of fermentation tank 26.

The third ethanol sensor 42C operates on a different principle. When the lower reed switch 136B is activated, that means the circulating coolant contains at least 1% by weight ethanol, and thus circulating coolant is not released via valve 82 to the waste tank 84. When the lower reed switch 136 is not activated, i.e., the lower float 130 is above reed switch 136B, circulating coolant is allowed to pass to the waste tank 84. However, this can occur only if there is sufficient circulating coolant to maintain the engine cool. To determine this, a secondary upper reed switch 149 is provided. As long as the upper float 128 is above the secondary upper reed switch 149, coolant can be sent to the waste tank 84. Whenever the upper reed switch is at or below the elevation of the secondary upper reed switch 149, coolant cannot go to the waste tank 84, regardless of the ethanol content of the circulating coolant. Whenever the upper float 128 is below the main upper reed switch 134, valve 100 is opened to bring in fresh product of fermentation.

For the third sensor 42C, preferably all of the reed switches used extend downwardly through the tube 126, because the third sensor is placed directly in the expansion tank 18. Switch 134A is in this preferred configuration.

Vapor Carburetor

FIG. 3 shows details of the gas phase carburetor 56 used with the engine 10. The carburetor 56 is mounted in a venturi section 160 of the intake manifold line 162. The intake manifold includes a choke 208 and a throttle 210. The carburetor 56 comprises an oblong housing 164 enclosing a chamber 165 having a diaphragm 166 mounted across its long axis, thereby separating the chamber 165 into an upper cavity 168 and a lower cavity 170. The upper cavity 168 is connected by a passageway 172 to the venturi section 160 of the intake line 162. The lower cavity is connected by a passage 174 to an upstream portion 176 of the intake line 162.

At the bottom of the chamber 164 is a T connection 180. The straight through section 181 of the T connection connects the bottom of the lower cavity 170 with the venturi section 160 of the intake line 162. The leg portion 182 of the T connection 180 is for introduction of alcohol vapor.

A needle-nosed rod 184 extends vertically all the way through the top of the housing 164, through the diaphragm 166, and into the T connection to a level below the leg portion 182. The top of the rod 184 is threaded and an idle adjustment nut 186 is mounted on the threaded portion. Mounted on the rod adjacent the top and bottom surfaces of the diaphragm are washers and gaskets 188. A spring 192 is mounted around the rod 184 between the adjustment nut 186 and the upper washer 188. The spring biases the diaphragm downwardly.

In operation, when the gas pedal of the automobile is stepped upon, increased air flow results in an increase in the pressure differential between the venturi section 160 and the upstream section 176 of the intake line 162. This causes the diaphragm 166 to rise, thereby pulling the rod 184 upwardly. The upward movement of the rod 184 causes less obstruction of the alcohol vapor passing into the intake line 162 via the leg portion 188 of the T connection 180, resulting in more alcohol vapor passing to the engine.

A release of the gas pedal causes the opposite effect, with a decrease in pressure differential between the venturi 160 and the upstream portion 176 of the intake line 162. This causes the diaphragm 166 to move relatively downwardly, thereby increasing the obstruction of the fuel feed line 182 and reducing the amount of ethanol vapor passing to the engine.

Alcohol Carburetor

FIG. 4 shows the details of the liquid alcohol carburetor 74. A special carburetor 76 is required because the ethanol can contain as much as forty to fifty percent by weight water. The novel carburetor 74 accommodates changes in the water content of the fuel so that sufficient combustible fuel reaches the engine in the most efficient alcohol to air ratio.

With reference to FIG. 4, the carburetor 74 is mounted adjacent the intake line 202 to the engine. The intake line 202 can have an electric air heater (not shown) at the upstream section 204. The intake line 202 includes a narrow venturi section 206. Upstream of the venturi section 206 is a conventional choke 208 and downstream of the venturi section is a conventional throttle valve 210. The carburetor 74 comprises a housing 211 enclosing a chamber 212. The housing 211 has a vertically oriented fuel inlet line 214 which terminates within the chamber 212 at about the middle level of the chamber.

Within the chamber is a first hydrometer float 220 that has an upwardly extending weight arm 222 that extends outside the housing 211. The upper portion of the weight arm 222 is surrounded by retaining sleeve 224. The sleeve 224 is not in contact with the arm 222 so that the hydrometer float 220 can float up and down within the chamber 212. Around the weight arm is a second float 230 that is donut shaped. On the bottom of the second float 230 is a horizontally extending plate 232 that is pivotally mounted to the internal wall 234 of the housing 211. The float 230 has a density such that it floats on top of the fuel in the chamber 212 regardless of the water content of the fuel. The second float 230 controls the liquid level in the chamber. As the liquid level drops, the second float drops, thereby pivoting the plate 232 downward, which opens the fuel feed line 214. As the chamber becomes fuller, the float 230 rises, thereby pivoting the plate 232 upward, blocking the fuel feed line 214.

The bottom of chamber 212 has a fuel outlet 260 that communicates via a conduit 262 to the venturi section 206 of the intake line 202. The vacuum created by the venturi aspirates fuel via line 262 into the intake line 202.

The float 220 is constructed from a material that floats in the chamber at a level dependent upon the water content of the mixture in the chamber 212. As the water content of the mixture increases, and it becomes more dense, the float 220 floats higher so the distance between the float 220 and the fuel outlet 260 increases. As the water content of the mixture decreases, the float 220 floats lower, thereby decreasing the distance between the float 220 and the fuel outlet 260. A needle-shaped extension 280 is mounted on the bottom of the float 220 and extends downwardly through the fuel outlet 260 into line 262. As the float 220 floats lower due to an increase in alcohol content of the mixture in the chamber 212, the needle 280 blocks off an increasing amount of the cross-sectional area of the fuel outlet 260, thereby decreasing the amount of the mixture passing from the chamber 212 into the intake line 202. Similarly, as the float 220 floats higher in the chamber 212 as the alcohol content the mixture in the chamber decreases, the needle 280 blocks off a smaller proportion of the cross-sectional area of the fuel outlet 260. This results in more of the mixture in the chamber passing via line 262 to the intake line 202.

Thus, the carburetor 74 automatically adjusts the amount of alcohol/water mixture passing to the engine for combustion as a function of the water content of the mixture. As the water content increases and the mixture has a lower fuel value, more fuel is introduced to the engine. As the water content decreases and the mixture has a higher fuel content, less mixture is passed to the engine.

The second float 220 can be made of a material such as polypropylene, or fabricated as a hollow metal float. The position of the float 220 can be adjusted by fastening weights on the weight arm 222.

Although the present invention has been described in considerable detail with reference to certain preferred versions thereof, other versions are possible. For example, the carburetor 74 and the sensor 42 can be used with any liquids of different densities which can be mixed to form a homogeneous mixture such as an emulsion, or with a mixture of a liquid containing variable amounts of a dissolved solid. Further, the sensor can be provided with a plurality of reed switches 134 and 136 along its side wall to detect incremental changes in density. Moreover, the engine 10 need not be used with a vehicle, but can be stationary. Therefore, the spirit and scope of the appended claims should not necessarily be limited to the description of the preferred versions contained herein.

What is claimed is:

1. A method for providing fuel to an engine comprising a carburetor and a cooling circuit having a circulating coolant therein, the method comprising the steps of:
   (a) circulating a product of fermentation in the cooling circuit, the product of fermentation comprising a fuel and water;
   (b) maintaining the cooling circuit at a sufficiently high temperature to distill fuel-rich vapor from the product of fermentation, the fuel-rich vapor having a higher fuel content then the fuel content of the coolant in the cooling circuit; and
   (c) burning at least a portion of the fuel of the fuel-rich vapor in the engine.

2. The method of claim 1 in which the engine is a vehicle engine.

3. The method of claim 2 in which the product of fermentation comprises ethanol and water.

4. The method of claim 2 in which the step of burning comprises introducing the fuel-rich vapor directly to a carburetor.

5. The method of claim 2 including the steps of introducing the fuel-rich vapor to a reflux zone having a top zone and a bottom zone for separating the vapor into a fuel-enriched vapor and a fuel-lean liquid, withdrawing the fuel-lean liquid from the bottom portion of the reflux zone, and withdrawing the fuel-enriched vapor from the top portion of the reflux zone.

6. The method of claim 5 including the step of recycling at least a portion of the fuel-lean liquid to the cooling circuit.

7. A method for providing fuel to an internal combustion engine in a vehicle, the engine comprising a carburetor and a cooling circuit with a circulating liquid therein, the method comprising the steps of:
   (a) circulating a product of fermentation in the cooling system, the product of fermentation comprising ethanol, water, and solid impurities;
   (b) maintaining the cooling circuit at a sufficiently high temperature to distill enthanol-rich vapor from the circulating liquid, the ethanol-rich vapor having a higher ethanol content than the ethanol content of the circulating liquid in the cooling circuit;
   (c) introducing the ethanol rich vapor to a reflux zone for separating the vapor into an ethanol-enriched gas and an ethanol-lean liquid;
   (d) withdrawing the ethanol-lean liquid from a bottom portion of the reflux zone;
   (e) withdrawing the ethanol-enriched vapor from a top portion of the reflux zone;
   (f) condensing the ethanol-enriched vapor;
   (g) burning at least a portion of said formed condensate in the engine; and
   (h) recycling at least a portion of the ethanol-lean liquid to the cooling circuit for distilling fuel therefrom.

8. The method of claim 7 including the steps of:
   (a) monitoring the ethanol content of the circulating liquid in the cooling circuit, and
   (b) withdrawing circulating liquid from the cooling circuit and introducing the product of fermentation into the cooling circuit when the ethanol content of the circulating liquid is below a selected value.

9. A method for providing fuel to a vehicle engine comprising a carburetor and a cooling circuit having a circulating coolant therein, the method comprising the steps of:
   (a) circulating a product of fermentation in the cooling circuit, the product of fermentation comprising a fuel and water;
   (b) maintaining the cooling circuit at a sufficiently high temperature to distill fuel-rich vapor from the product of fermentation, the fuel-rich vapor having a higher fuel content than the fuel content of the coolant in the cooling circuit;
   (c) introducing the fuel-rich vapor to a reflux zone having a top zone and a bottom zone for separating the vapor into a fuel-enriched vapor and a fuel-lean liquid;

(d) withdrawing the fuel-lean liquid from the bottom portion of the reflux zone;

(e) withdrawing the fuel-enriched vapor from the top portion of the reflux zone;

(f) condensing the fuel-enriched vapor; and (g) burning at least a portion of the formed condensate in the engine.

10. The method of claim 9 including the step of monitoring the fuel content of the formed condensate.

11. The method of claim 10 including the step of burning the condensate in the engine when the fuel content of the condensate is above a selected value.

12. The method of claim 10 including the step of recycling the condensate to the cooling circuit when its fuel content is below a selected value.

13. A method for providing fuel to a vehicle engine comprising a carburetor and a cooling circuit having a circulating coolant therein, the method comprising the steps of:

(a) circulating a product of fermentation in the cooling circuit, the product of fermentation comprising a fuel and water;

(b) maintaining the cooling circuit at a sufficiently high temperature to distill fuel-rich vapor from the product of fermentation, the fuel-rich vapor having a higher fuel content than the fuel content of the coolant in the cooling circuit;

(c) monitoring the fuel content of the coolant;

(d) withdrawing coolant from the cooling circuit and introducing the product of fermentation into the cooling circuit when the fuel content of the circulating liquid is below a selected value; and (e) burning at least a portion of the fuel of the fuel-rich vapor in the engine.

14. In an engine comprising a carburetor and a cooling circuit having a circulating coolant therein, the improvement comprising:

(a) a storage tank for a product of fermentation comprising a fuel and water;

(b) means for introducing the product of fermentation into the cooling circuit;

(c) temperature control means for maintaining the cooling circuit at a sufficiently high temperature to distill fuel-rich vapor from the circulating coolant;

(d) a reflux tank for separating the fuel-rich vapor into a fuel-enriched vapor and a fuel-lean liquid; and (e) means for introducing at least a portion of the fuel of the fuel-rich vapor into the engine for combustion, the introducing means comprising:

(i) means for introducing the fuel-rich vapor into the reflux tank;

(ii) means for withdrawing the fuel-lean liquid from a bottom portion of the reflux tank;

(iii) means for withdrawing fuel-enriched vapor from a top portion of the reflux tank; and (iv) means for burning at least a portion of the fuel of the fuel-enriched vapor in the engine.

15. The engine of claim 14 including a condensor for condensing the fuel-enriched vapor and means for passing said condensate to the engine for burning.

16. The engine of claim 14 including means for recycling at least a portion of the fuel-lean liquid to the cooling circuit.

17. In an engine comprising a carburetor and a cooling circuit having a circulating coolant therein, the improvement comprising;

(a) a storage tank for a product of fermentation comprising a fuel and water;

(b) means for introducing the product of fermentation into the cooling circuit;

(c) temperature control means for maintaining the cooling circuit at a sufficiently high temperature to distill fuel-rich vapor from the circulating coolant; and (d) means for introducing at least a portion of the fuel of the fuel-rich vapor into the engine for combustion.

18. The engine of claim 17 in which the engine powers a vehicle.

19. The engine of claim 18 in which the introducing means comprises means for introducing the fuel-rich vapor directly to the carburetor for burning.

20. In an engine for powering a vehicle comprising a carburetor and a cooling circuit having a circulating coolant therein, the improvement comprising:

(a) a storage tank for a product of fermentation comprising a fuel and water;

(b) means for introducing the product of fermentation into the cooling circuit;

(c) temperature control means for maintaining the cooling circuit at a sufficiently high temperature to distill fuel-rich vapor from the circulating coolant;

(d) means for introducing at least a portion of the fuel of the fuel-rich vapor into the engine for combustion;

(e) means for condensing the fuel-enriched vapor; and (f) means for monitoring the fuel content of the condensate.

21. The engine of claim 20 including means for passing the condensate to the engine for burning when the fuel content of the condensate is above a selected value.

22. The engine of claim 20 including means for passing the condensate to the cooling circuit when the fuel content of the condensate is below a selected value.

23. In an engine for powering a vehicle comprising a carburetor and a cooling circuit having a circulating coolant therein, the improvement comprising:

(a) a storage tank for a product of fermentation comprising a fuel and water;

(b) means for introducing the product of fermentation into the cooling circuit;

(c) temperature control means for maintaining the cooling circuit at a sufficiently high temperature to distill fuel-rich vapor from the circulating coolant;

(d) means for introducing at least a portion of the fuel of the fuel-rich vapor into the engine for combustion;

(e) means for monitoring the fuel content of the circulating liquid in the cooling circuit; and (f) means for withdrawing circulating liquid from the cooling circuit and introducing the product of fermentation into the cooling circuit when the fuel content of the circulating liquid is below a selected value.

* * * * *